(12) United States Patent
Cho

(10) Patent No.: US 12,704,166 B2
(45) Date of Patent: Aug. 11, 2026

(54) FREQUENCY-SENSITIVE SHOCK ABSORBER AND METHOD OF OPERATING SAME

(71) Applicant: HL MANDO CORPORATION, Pyeongtaek-si (KR)

(72) Inventor: Sangyeon Cho, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 613 days.

(21) Appl. No.: 18/219,776

(22) Filed: Jul. 10, 2023

(65) Prior Publication Data

US 2024/0288048 A1 Aug. 29, 2024

(30) Foreign Application Priority Data

Feb. 28, 2023 (KR) ........................ 10-2023-0026731

(51) Int. Cl.
*F16F 9/36* (2006.01)
*F16F 9/34* (2006.01)
*F16F 9/46* (2006.01)
*F16F 9/516* (2006.01)

(52) U.S. Cl.
CPC .............. *F16F 9/516* (2013.01); *F16F 9/368* (2013.01); *F16F 2222/12* (2013.01); *F16F 2228/04* (2013.01); *F16F 2230/30* (2013.01)

(58) Field of Classification Search
CPC ........ F16F 9/516; F16F 9/368; F16F 2222/12; F16F 2228/04; F16F 2230/30; F16F 9/465; F16F 9/5126; F16F 9/348; F16F 9/3484
See application file for complete search history.

(56) References Cited

U.S. PATENT DOCUMENTS 7,694,785 B2 * 4/2010 Nakadate .............. F16F 9/3484 188/266.5
7,699,148 B2 * 4/2010 Forster .................... F16F 9/512 188/316
7,757,826 B2 * 7/2010 Hayama .................. F16F 9/465 188/322.22

(Continued)

FOREIGN PATENT DOCUMENTS

KR 10-2013-0104250 A 9/2013
KR 10-2020-0134529 A 12/2020

(Continued)

*Primary Examiner* — Robert A. Siconolfi
*Assistant Examiner* — James K Hsiao
(74) *Attorney, Agent, or Firm* — Hauptman Ham, LLP

(57) ABSTRACT

Disclosed herein is a frequency-sensitive shock absorber including a piston rod, a piston valve, and a valve assembly mounted on the piston rod and configured to generate a damping force that changes according to a frequency during a tension stroke, wherein the valve assembly includes a main retainer in which a main chamber communicating with the connection flow path is formed, a housing including a first pilot chamber, a second pilot chamber and an intermediate flow path, a pilot valve disposed between the housing and the main retainer, configured to divide the first pilot chamber from the main chamber, and elastically deformed due to a pressure difference between the main chamber and the pilot chamber, and a free piston provided inside the second pilot chamber and configured to vertically move according to a change in pressure of the second pilot chamber.

20 Claims, 11 Drawing Sheets

(56) References Cited

U.S. PATENT DOCUMENTS

| | | | | |
|---|---|---|---|---|
| 8,794,405 | B2 * | 8/2014 | Yamashita | F16F 9/468 188/317 |
| 9,500,255 | B2 * | 11/2016 | Nowaczyk | F16F 9/512 |
| 10,563,721 | B2 | 2/2020 | Knapczyk et al. | |
| 10,774,895 | B2 | 9/2020 | Yan | |
| 11,242,906 | B2 * | 2/2022 | Im | F16F 9/3415 |
| 11,796,024 | B2 * | 10/2023 | Baek | F16F 9/49 |
| 2013/0048451 | A1 * | 2/2013 | Yamashita | F16F 9/5126 188/280 |
| 2013/0140117 | A1 * | 6/2013 | Yu | F16F 9/5126 188/280 |
| 2020/0370616 | A1 * | 11/2020 | Kim | F16F 9/3487 |
| 2020/0393015 | A1 * | 12/2020 | Kim | F16F 9/3482 |
| 2021/0070130 | A1 * | 3/2021 | Cheong | F16F 9/368 |
| 2022/0412429 | A1 * | 12/2022 | Kim | F16F 9/19 |
| 2023/0101911 | A1 * | 3/2023 | Kim | F16F 9/3484 188/280 |

FOREIGN PATENT DOCUMENTS

| | | | |
|---|---|---|---|
| KR | 10-2020-0142293 | A | 12/2020 |
| KR | 10-2021-0089457 | A | 7/2021 |
| KR | 10-2021-0124779 | A | 10/2021 |
| KR | 10-2022-0142880 | A | 10/2022 |

* cited by examiner

FREQUENCY-SENSITIVE SHOCK ABSORBER AND METHOD OF OPERATING SAME

CROSS-REFERENCE TO RELATED APPLICATION

This application claims the benefit of Korean Patent Application No. 10-2023-0026731, filed on Feb. 28, 2023 in the Korean Intellectual Property Office, the disclosure of which is incorporated herein by reference in its entirety.

BACKGROUND

1. Field

Embodiments of the present disclosure relate to a frequency-sensitive shock absorber and a method of operating the same, and more particularly, to a frequency-sensitive shock absorber that implements different damping forces according to frequencies to satisfy both ride comfort and steering stability of a vehicle, and a method of operating the same.

2. Description of the Related Art

Roads on which vehicles travel may be bumpy, may have many speed bumps, or may be even unpaved. Shock absorbers are devices that improve ride comfort by eliminating shacking caused by the curvature of road surfaces when the vehicles travel.

When producing more damping forces than necessary while the vehicles travel, the shock absorbers impair steering stability of the vehicles. On the other hand, when producing less damping forces than necessary, the shock absorbers impair the ride comfort. Thus, when the vehicles are designed, it is very important to properly adjust damping force characteristics of the shock absorbers.

The shock absorber is typically provided with a cylinder filled with a working fluid (oil), a piston rod connected to a vehicle body side to reciprocate, and a piston valve that is coupled to a lower end of the piston rod, slides in the cylinder, and controls flow of the working fluid.

The conventional shock absorber has a structure in which a damping force changes according to a speed change of the piston regardless of a frequency or stroke. However, since the shock absorber of which the damping force is adjusted only according to the speed change of the piston generates the same damping force in various road conditions, it is difficult to satisfy both the ride comfort and the steering stability.

In order to solve this problem, a valve assembly is provided at a lower end of the piston valve so that the damping force of the shock absorber may change according to various road surface conditions, that is, various frequencies and strokes. In the conventional valve assembly, each of an upper side and a lower side thereof is provided with a rubber-made pilot valve to adjust the damping force through elastic deformation of the pilot valves.

However, when the two pilot valves are provided in the shock absorber, cost competitiveness is lowered, and durability is lowered. In particular, the pilot valves have limitations in temperature and internal pressure, and thus the pilot valves cannot be applied to vehicles that require a high damping force and damper performance.

Thus, a shock absorber that adjusts the damping force according to the frequency and includes a valve assembly having lower costs and higher performance, and a method of operating the same are required.

RELATED ART DOCUMENT

Patent Document

Korean Patent Application Publication No. 10-2022-0142880 (published on Oct. 24, 2022).

SUMMARY

Therefore, it is an aspect of the present disclosure to provide a frequency-sensitive shock absorber capable of satisfying ride comfort and steering stability of a vehicle by generating a damping force that changes according to a frequency and a speed change by installing a valve assembly together with a piston valve, and a method of operating the same.

It is another aspect of the present disclosure to provide a frequency-sensitive shock absorber capable of preventing performance of the steering stability from being degraded by preventing a damping force from being degraded in a low speed section during a tension stroke at a high frequency region, and a method of operating the same.

It is still another aspect of the present disclosure to provide a frequency-sensitive shock absorber capable of preventing performance of the ride comfort from being degraded due to a decrease in performance of the damping force in a middle and high speed section during the tension stroke at the high frequency region, and a method of operating the same.

It is yet another aspect of the present disclosure to provide a frequency-sensitive shock absorber having improved performance of the damping force using a free piston having a long sliding length in the valve assembly, and a method of operating the same.

It is yet another aspect of the present disclosure to provide a frequency-sensitive shock absorber capable of improving space utilization by reducing a basic length of a product and increase and secure a damper stroke, and a method of operating the same.

It is yet another aspect of the present disclosure to provide a frequency-sensitive shock absorber having increased durability by improving durability of the valve assembly, and a method of operating the same.

It is yet another aspect of the present disclosure to provide a frequency-sensitive shock absorber that reduces costs and improves mass productivity by reducing the number of components and simplifying the components, and a method of operating the same.

Additional aspects of the disclosure will be set forth in part in the description which follows and, in part, will be obvious from the description, or may be learned by practice of the disclosure.

In accordance with one aspect of the present disclosure, there is provided a frequency-sensitive shock absorber including a piston rod which reciprocates inside a cylinder and in which a connection flow path is formed in a lengthwise direction, a piston valve which is mounted on the piston rod, through which a plurality of compression flow paths and a plurality of tension flow paths vertically pass, and which divides the cylinder into a compression chamber and a tension chamber, and a valve assembly that is mounted on the piston rod and generates a damping force that changes according to a frequency during a tension stroke, wherein the valve assembly includes a main retainer in which a main chamber communicating with the connection flow path is formed, a housing including a first pilot chamber that is formed at a lower portion thereof and communicates with the connection flow path, a second pilot chamber that is formed at an upper portion thereof and communicates with the first pilot chamber, and an intermediate flow path connecting the first pilot chamber and the second pilot chamber, a pilot valve that is disposed between the housing and the main retainer, divides the first pilot chamber from the main chamber, and is elastically deformed due to a pressure difference between the main chamber and the pilot chamber, and a free piston provided inside the second pilot chamber and configured to vertically move according to a change in pressure of the second pilot chamber.

The valve assembly may further include a pilot disc disposed on the second pilot chamber and elastically deformed according to the change in the pressure of the second pilot chamber.

The free piston may include a free piston side wall portion of which an outer circumferential surface is provided adjacent to an inner circumferential surface of the second pilot chamber, and a free piston ceiling portion of which an upper surface is provided adjacent to a lower surface of the pilot disc.

The free piston may include a seal accommodation port recessed inward from the free piston side wall portion along a side surface thereof and a piston seal accommodated in the seal accommodation port and of which one side is in close contact with the housing.

The free piston ceiling portion may have an inner end spaced apart from the housing.

The free piston ceiling portion may have an upper surface of an outer end in contact with the lower surface of the pilot disc and may be inclined downward toward an inner end thereof.

The pilot valve may include a pilot body portion of which a lower surface is in close contact with an upper portion of the main retainer and a pilot valve portion protruding along an outer edge of the pilot body portion to be in close contact with an inner circumferential surface of the housing.

The main retainer may include first seat portions protruding at predetermined intervals along an inner edge thereof, second seat portions protruding along an outer edge thereof, and a first main flow path formed between the first seat portions to communicate with the connection flow path.

The main retainer may include third seat portions protruding at predetermined intervals between the first seat portions and the second seat portions and a second main flow path formed between the third seat portions to communicate with the first main flow path.

The valve assembly may further include an inlet disc interposed between the pilot valve and the housing and having at least one slit that allows the connection flow path and the first pilot chamber to communicate with each other.

The pilot disc may include a pilot adjustment disc that adjusts a flow rate of a working fluid flowing out from the second pilot chamber.

The pilot disc may include an auxiliary pilot disc that elastically supports the pilot adjustment disc.

The valve assembly may include a spacer coupled to the piston rod and provided at an upper end of the pilot disc.

The valve assembly may include a valve washer coupled to the piston rod, provided at an upper end of the spacer, and extending outward to support the elastically deformed pilot disc from above.

The pilot valve may further include at least one auxiliary pilot valve disc interposed between the pilot valve and the main retainer.

The pilot valve portion may include a valve protrusion protruding upward from an upper surface thereof.

The piston seal may be made of Teflon or rubber or a bearing.

In accordance with another aspect of the present disclosure, there is provided a method of operating a frequency-sensitive shock absorber including a piston rod that reciprocates inside a cylinder, a piston valve that is mounted on the piston rod and divides the cylinder into a compression chamber and a tension chamber, and a valve assembly that is mounted on the piston rod and generates a damping force that changes according to a frequency during a tension stroke, wherein, in the case of a tension stroke at a low frequency region, a working fluid may flow into the valve assembly along a connection flow path provided inside the piston rod, the working fluid flowing into the valve assembly may flow to a main chamber provided in a main retainer and a first pilot chamber provided in a housing, and a pilot valve disposed between the housing and the main retainer may achieve pressure equilibrium so that the working fluid flowing into the valve assembly flows to only the first pilot chamber.

In accordance with still another aspect of the present disclosure, there is provided a method of operating a frequency-sensitive shock absorber including a piston rod that reciprocates inside a cylinder, a piston valve that is mounted on the piston rod and divides the cylinder into a compression chamber and a tension chamber, and a valve assembly that is mounted on the piston rod and generates a damping force that changes according to a frequency during a tension stroke, wherein, in the case of a tension stroke at a high frequency region, a working fluid may flow into the valve assembly along a connection flow path provided inside the piston rod, the working fluid flowing into the valve assembly flows to a main chamber provided in a main retainer and a first pilot chamber provided in a housing, and a pilot valve disposed between the housing and the main retainer is elastically deformed upward so that the working fluid flowing into the main chamber flows out to the compression chamber.

The working fluid flowing into the first pilot chamber may flow to a second pilot chamber through an intermediate flow path, a free piston provided inside the second pilot chamber may be pushed upward, the working fluid flowing into the second pilot chamber may flow to a space between the free piston and a pilot disc provided on the free piston through a space provided between the free piston and an inner wall of the housing, and the pilot disc may be elastically deformed upward so that the working fluid flowing into the second pilot chamber flows out to the compression chamber.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
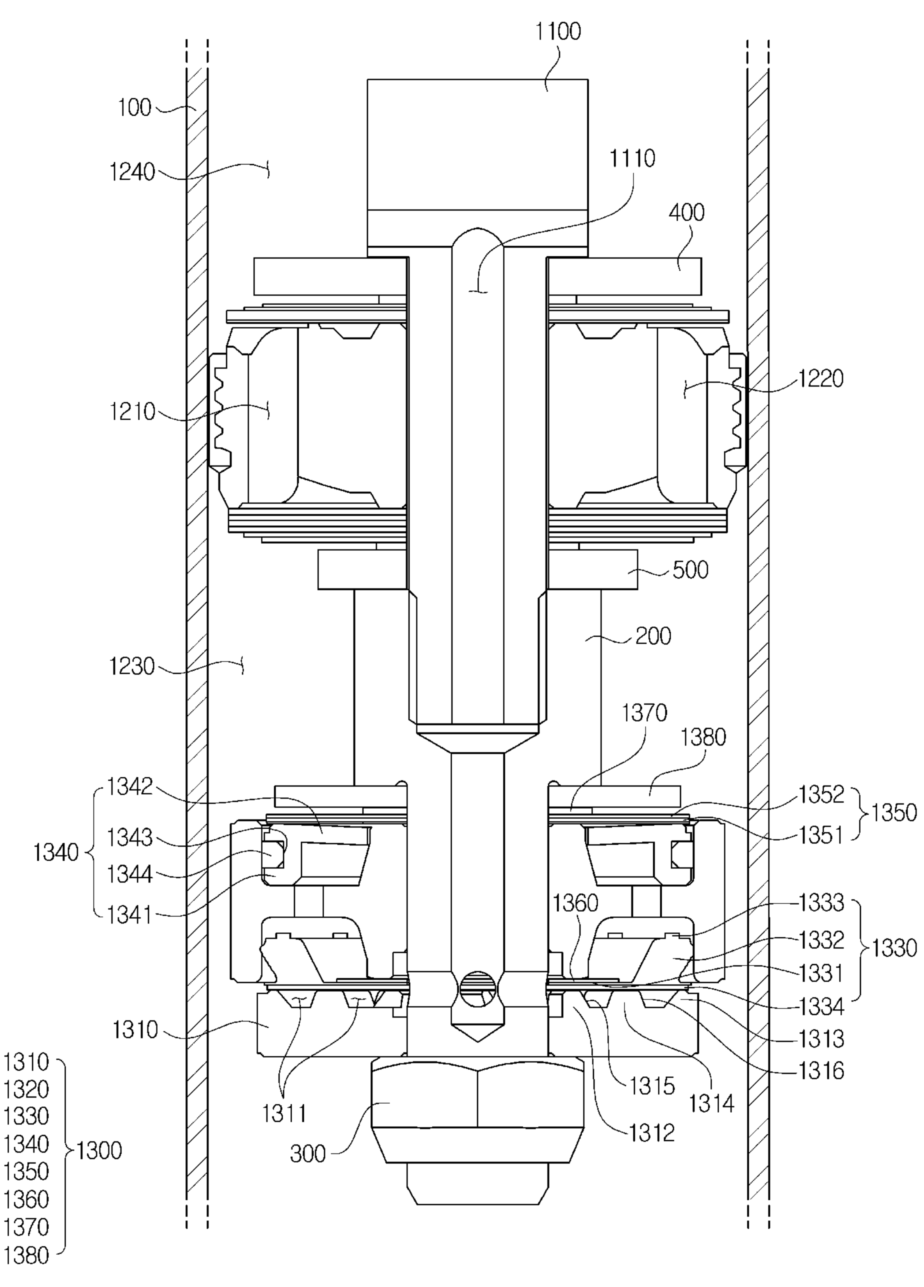
FIG. 1 is a cross-sectional view illustrating a frequency-sensitive shock absorber according to a first embodiment of the present disclosure.

Hereinafter, present embodiments will be described in detail with reference to the accompanying drawings. The following embodiments are presented to sufficiently transfer the spirit of the present disclosure to those skilled in the art to which the present disclosure pertains. The present disclosure is not limited to the embodiments presented herein and may be embodied in other forms. In the drawings, illustration of components irrelevant to the description will be omitted to clarify the present disclosure, and the sizes of the components may be slightly exaggerated to help understanding.

Figure 2:
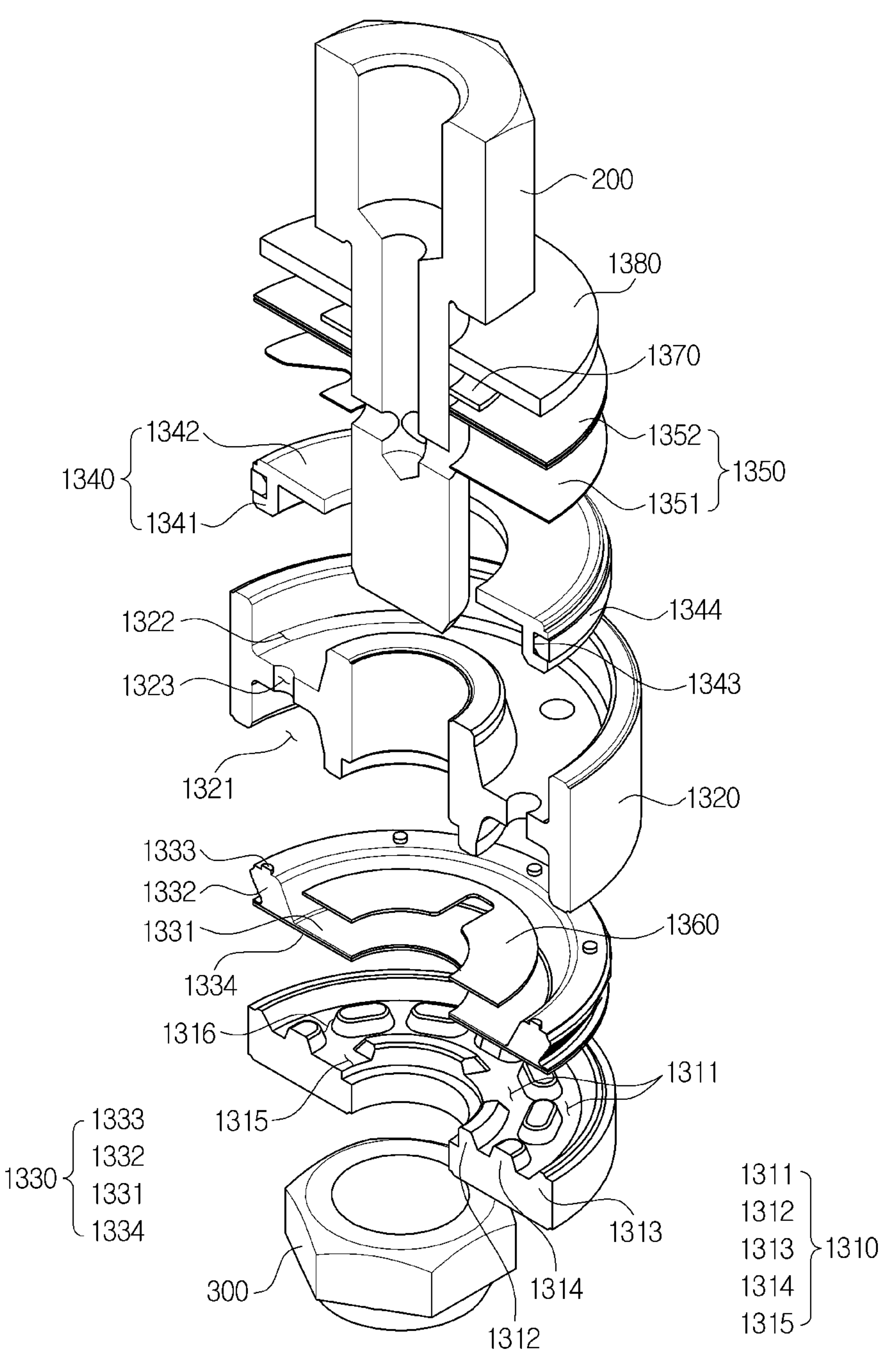
FIG. 2 is an exploded perspective view illustrating a valve assembly of the frequency-sensitive shock absorber according to the first embodiment of the present disclosure.

FIG. 1 is a cross-sectional view illustrating a frequency-sensitive shock absorber according to a first embodiment of the present disclosure, and FIG. 2 is an exploded perspective view illustrating a valve assembly 1300 of the frequency-sensitive shock absorber according to the first embodiment of the present disclosure.

Referring to FIGS. 1 and 2, the frequency-sensitive shock absorber according to the first embodiment of the present disclosure includes a piston rod 1100 reciprocating inside a cylinder 100, a piston valve 1200 and the valve assembly 1300 sequentially coupled to the piston rod 1100, and a nut 300 that fixes the piston valve 1200 and the valve assembly 1300 after the sequential coupling.

One end of the piston rod 1100 is positioned inside the cylinder 100, and the other end thereof extends outward from the cylinder 100 and is connected to a vehicle body side or a wheel side of a vehicle.

A small diameter portion having a smaller radius so that the piston valve 1200 and the valve assembly 1300 are easily mounted may be provided at one end of the piston rod 1100. Further, as in one embodiment of the present disclosure, a portion in which the small diameter portion is provided may be provided as a piston guide 200 that is a separate component.

An upper piston washer 400, the piston valve 1200, and a lower piston washer 500 are sequentially coupled to the piston rod 1100 in order from top.

The piston valve 1200 is provided to reciprocate inside the cylinder 100 filled with the working fluid together with the piston rod 1100 while the piston rod 1100 is coupled therethrough. At least one compression flow path 1210 and at least one tension flow path 1220 are formed to vertically pass through the piston valve 1200 so that the working fluid moves during compression and tension strokes.

The piston valve 1200 divides the cylinder 100 into a compression chamber 1230 and a tension chamber 1240 and reciprocates in directions of the compression and tension strokes inside the cylinder 100 to generate a damping force due to resistance of the working fluid.

For example, when the piston valve 1200 performs a compression stroke, a pressure of the lower compression chamber 1230 increases as compared to the upper tension chamber 1240. In this process, the working fluid filling the compression chamber 1230 due to the increase in the pressure of the compression chamber 1230 moves to the tension chamber 1240 while pushing and opening a valve device through the compression flow path 1210 of the piston valve 1200.

On the contrary, when the piston valve 1200 performs a tension stroke, a pressure of the tension chamber 1240 increases higher than the pressure of the compression chamber 1230, and in this process, the working fluid of the tension chamber 1240 moves to the compression chamber 1230 while pushing and opening the valve device through the tension flow path 1220.

The valve assembly 1300 is disposed below the piston valve 1200. In this case, the valve assembly 1300 may be mounted on the piston rod 1100, the piston guide 200 may be mounted on a distal end of the piston rod 1100, and the valve assembly 1300 may be mounted on the piston guide 200.

At least one connection flow path 1110 is recessed inside the piston rod 1100 in a lengthwise direction. The connection flow path 1110 is connected up to a place in which the valve assembly 1300 is disposed. Thus, when the piston guide 200 is provided, the connection flow path 1110 of the piston rod 1100 may communicate with a flow path provided inside the piston guide 200.

A length and cross section of the connection flow path 1110 may change according to specifications of products such as the piston valve 1200 and the valve assembly 1300, and when a product allows the interiors of the tension chamber 1240 and the valve assembly 1300 to communicate with each other, the product should be understood as the connection flow path 1110.

The valve assembly 1300 is mounted on the piston rod 1100 to be disposed below the piston valve 1200. The valve assembly 1300 may serve to generate a damping force that changes according to a frequency during the tension stroke.

The valve assembly 1300 may include a main retainer 1310 in which a main chamber 1311 is formed, a housing 1320 in which a first pilot chamber 1321 and a second pilot chamber 1322 are formed, a pilot valve 1330 disposed between the housing 1320 and the main retainer 1310 to divide the first pilot chamber 1321 from the main chamber 1311, and a free piston 1340 provided inside the second pilot chamber 1322 to be vertically movable.

The main retainer 1310 is coupled to the piston rod 1100 or the piston guide 200, and the main chamber 1311 is formed between the first pilot valves 1330.

The main retainer 1310 has a hole passing through a center thereof so that the main retainer 1310 is mounted on the piston rod 1100 or the piston guide 200, seat portions protrude from an outer edge of the main retainer 1310, and thus the main chamber 1311 is formed inside the main retainer 1310. In detail, the main retainer 1310 may include first seat portions 1312 protruding at predetermined intervals along an inner edge thereof and second seat portions 1313 protruding along an outer edge thereof and includes a first main flow path 1315 formed between the first seat portions 1312 to communicate with the connection flow path 1110.

In this case, the main retainer 1310 may further include a third seat portion 1314 protruding at predetermined intervals between the first seat portions 1312 and the second seat portions 1313 and a second main flow path 1316 formed between the third seat portions 1314 to communicate with the first main flow path 1315.

However, the seat portion according to the present disclosure is not limited to the first seat portion 1312, the second seat portion 1313, and the third seat portion 1314 as in the first embodiment of the present disclosure, and includes all seat portions in which the shape, the number, the arrangement, or the like thereof are variously changed to appropriately control flow of the working fluid flowing through the main chamber 1311 during the tension stroke.

The housing 1320 is coupled to the piston rod 1100 or the piston guide 200, and inside the housing 1320, the first pilot chamber 1321 is formed on a lower side, the second pilot chamber 1322 is formed on an upper side, and an intermediate flow path 1323 connecting the first pilot chamber 1321 and the second pilot chamber 1322 is formed.

The pilot valve 1330 is coupled to the piston rod 1100, is disposed between the housing 1320 and the main retainer 1310, and divides the first pilot chamber 1321 from the main chamber 1311. The pilot valve 1330 may be elastically deformed due to a pressure difference between the main chamber 1311 and the pilot chamber to open or close the first pilot chamber 1321.

The pilot valve 1330 includes a pilot body portion 1331 having a lower surface in contact with an upper portion of the main retainer 1310 and a pilot valve portion 1332 protruding along an outer edge of the pilot body portion 1331 to be in close contact with an inner circumferential surface of the housing 1320.

The pilot valve portion 1332 may include a valve protrusion 1333 protruding upward from an upper surface thereof. Thus, even when the pilot valve portion 1332 is elastically deformed during a high-frequency tension stroke, the degree of deformation may be effectively limited.

The pilot valve 1330 may further include at least one auxiliary pilot valve disc 1334 interposed between the pilot valve 1330 and the main retainer 1310 to assist an elastic force of the pilot valve 1330.

An inlet disc 1360 is interposed between the pilot valve 1330 and the housing 1320. The inlet disc 1360 has at least one slit to allow the working fluid flowing from the connection flow path 1110 to flow to the first pilot chamber 1321.

The free piston 1340 is provided inside the second pilot chamber 1322. In a frequency-sensitive shock absorber according to the related art, a separate pilot valve 1330 is provided at a portion corresponding to the second pilot chamber 1322 to control opening and closing of the second pilot chamber 1322. However, since the pilot chamber is made of an elastic member such as rubber, there is a limit to a temperature and an internal pressure, and since a damper stroke that may be secured is limited, there is a limit to damping force performance. Further, the plurality of pilot chambers cause a cost increase. Thus, in the first embodiment and the second embodiment of the present disclosure, the problem according to the related art is solved by providing the free piston instead of providing a separate pilot chamber.

The free piston 1340 is provided to vertically move according to a change in pressure of the second pilot chamber 1322. Thus, since a long damper stroke distance is secured as compared to the pilot chamber, the performance of an accumulator is improved, and as a result, the damping force performance is improved.

In detail, the free piston 1340 includes a free piston side wall portion 1341 of which an outer circumferential surface is provided adjacent to an inner circumferential surface of the second pilot chamber 1322 and a free piston ceiling portion 1342 of which an upper surface is provided adjacent to a lower surface of a pilot disc 1350, which will be described below.

The free piston side wall portion 1341 is provided with a seal accommodation port 1343 recessed inward along a side surface thereof, and a piston seal 1344 is accommodated in the seal accommodation port 1343 and has one side in close contact with the housing 1320. Thus, the piston seal 1344 prevents oil leakage of the free piston 1340 and improves the durability when the free piston 1340 vertically slides.

The piston seal 1344 may be made of Teflon or rubber or a bearing.

The free piston ceiling portion 1342 has an inner end spaced apart from the housing 1320, and the free piston ceiling portion 1342 may have an upper surface of an outer end in contact with the lower surface of the pilot disc 1350, which will be described below, and may be inclined downward toward the inner end. Thus, the working fluid may fill a space provided between the free piston ceiling portion 1342 and the pilot disc 1350 while filling the second pilot chamber 1322. The free piston ceiling portion 1342 is inclined so that the free piston 1340 and the pilot disc 1350 effectively come into contact with each other, thereby effectively blocking the flow of the working fluid.

The pilot disc 1350 is disposed on the second pilot chamber 1322. That is, the pilot disc 1350 is disposed on the free piston ceiling portion 1342. The pilot disc 1350 is provided to be elastically deformable according to the change in the pressure of the second pilot chamber 1322 and controls the opening and closing of the second pilot chamber 1322.

A pilot adjustment disc 1351 that adjusts a flow rate of the working fluid flowing out from the second pilot chamber 1322 may be provided at a lower end of the pilot disc 1350, and a pilot auxiliary disc 1352 that elastically supports the pilot adjustment disc 1351 may be stacked on the pilot disc 1350. A plurality of pilot adjustment discs 1351 and a plurality of pilot auxiliary discs 1352 may be provided and stacked.

The valve assembly 1300 may include a spacer 1370 coupled to the piston rod 1100 and provided at an upper end of the pilot disc 1350 and includes a valve washer 1380 coupled to the piston rod 1100, provided at an upper end of the spacer 1370, and extending outward to support the elastically deformed pilot disc 1350 from above.

Hereinafter, a method of operating the frequency-sensitive shock absorber according to the first embodiment of the present disclosure according to different frequencies will be described.

Figure 3:
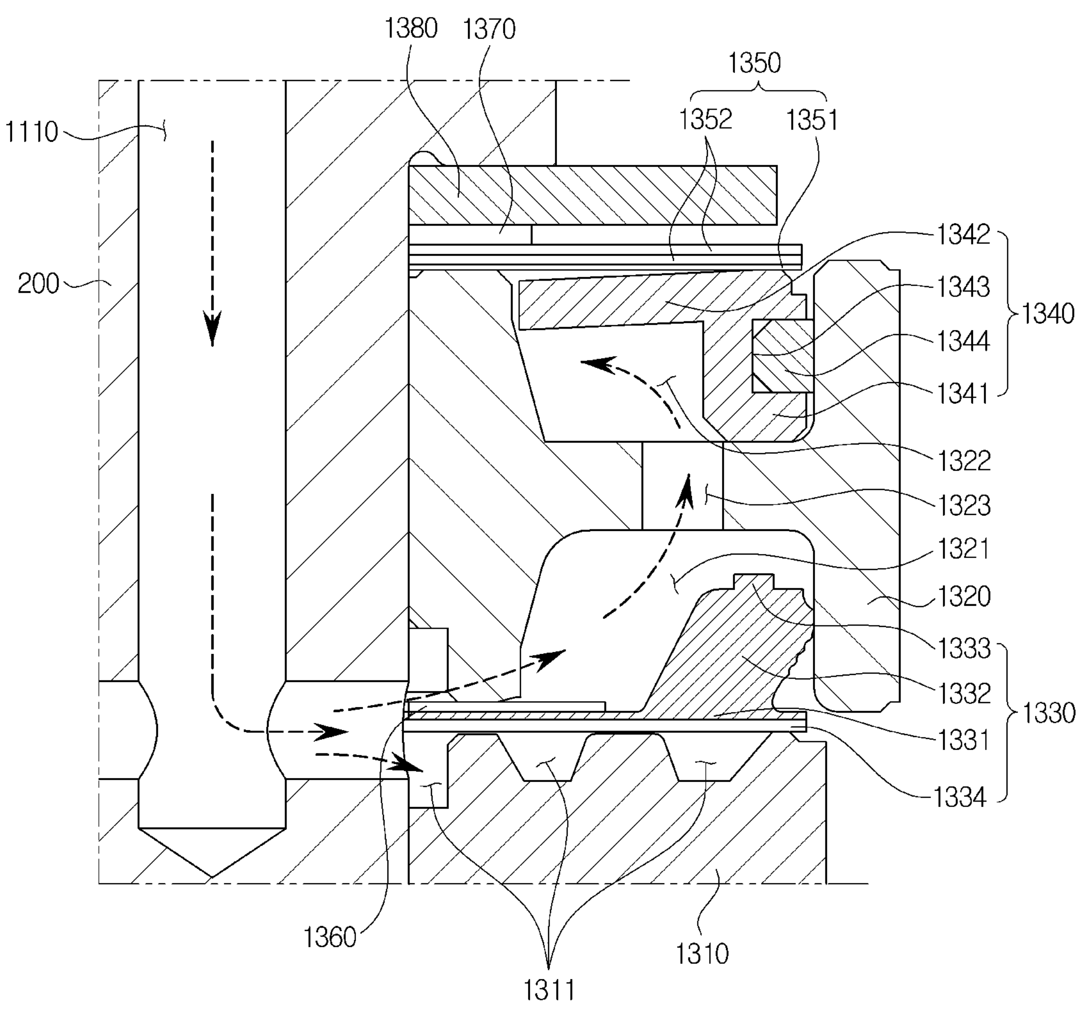
FIG. 3 is an enlarged view illustrating the operation of the valve assembly during a low-frequency tension stroke of the frequency-sensitive shock absorber according to the first embodiment of the present disclosure.

FIG. 3 is an enlarged view illustrating the operation of the valve assembly 1300 during a low-frequency tension stroke of the frequency-sensitive shock absorber according to the first embodiment of the present disclosure.

Referring to FIG. 3, when the frequency-sensitive shock absorber according to the first embodiment of the present disclosure performs the tension stroke in a low-frequency region, first, the working fluid flows into the valve assembly 1300 along the connection flow path 1110 provided inside the piston rod 1100.

In this way, the working fluid flowing into the valve assembly 1300 flows to the main chamber 1311 provided in the main retainer 1310 and the first pilot chamber 1321 provided in the housing 1320 on the basis of a boundary between the pilot valve 1330 and the inlet disc 1360.

In this case, the amount of the working fluid flowing into the first pilot chamber 2321 through the inlet disc 1360 in the low-frequency region is sufficient to smoothly form a pressure of the first pilot chamber 1321. Thus, the second pilot chamber 1322 and the main chamber 1311 are in pressure equilibrium with respect to the pilot valve 1330, and thus the pilot valve 1330 is not elastically deformed. In other words, the pilot valve 1330 maintains contact with the upper portion of the main retainer 1310. That is, the working fluid flowing into the valve assembly 1300 flows to only the first pilot chamber 1321 after the main chamber 1311 is filled with the working fluid.

Figure 4:
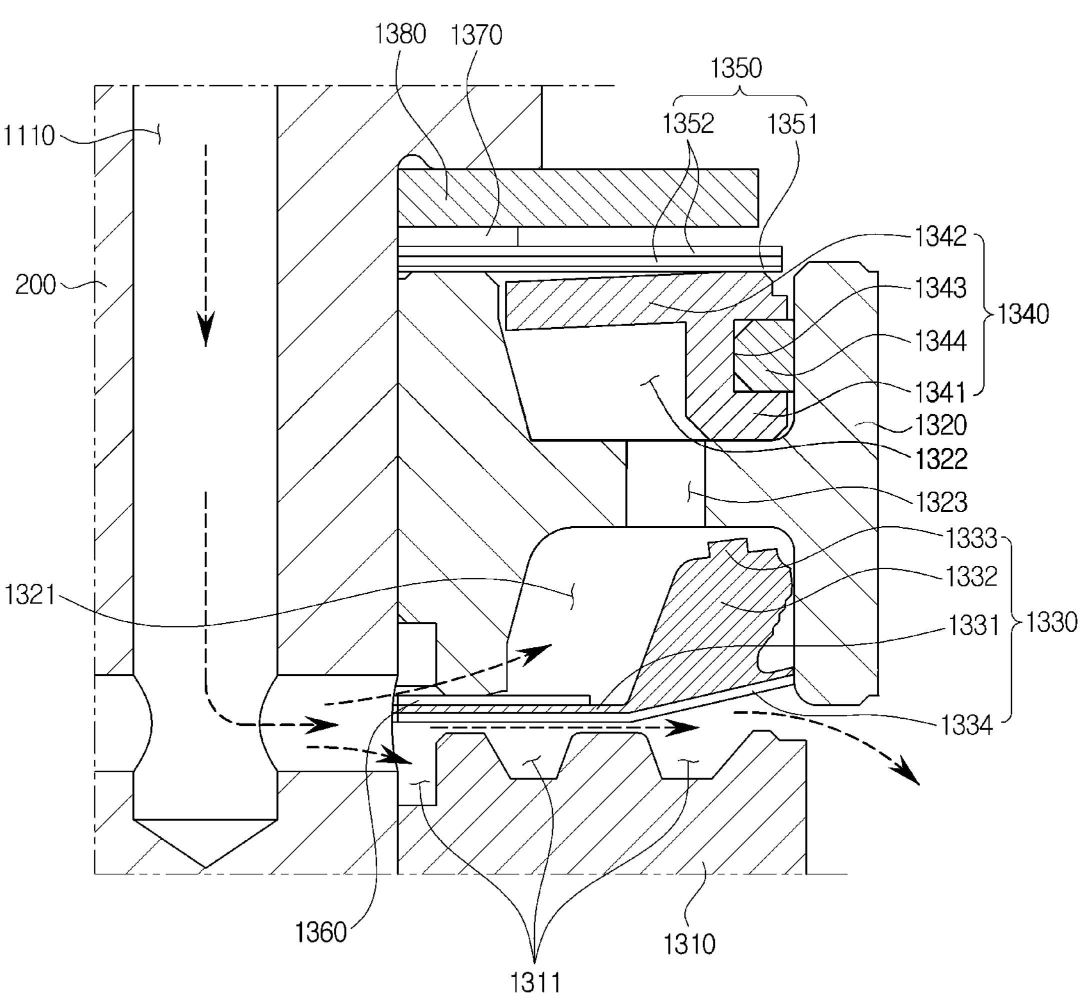
FIG. 4 is an enlarged view illustrating the operation of the valve assembly during a high-frequency tension stroke of the frequency-sensitive shock absorber according to the first embodiment of the present disclosure.

FIG. 4 is an enlarged view illustrating the operation of the valve assembly 1300 during a high-frequency tension stroke of the frequency-sensitive shock absorber according to the first embodiment of the present disclosure.

Referring to FIG. 4, when the frequency-sensitive shock absorber according to the first embodiment of the present disclosure performs the tension stroke in a high-frequency region, first, the working fluid flows into the valve assembly 1300 along the connection flow path 1110 provided inside the piston rod 1100.

In this way, the working fluid flowing into the valve assembly 1300 flows to the main chamber 1311 provided in the main retainer 1310 and the first pilot chamber 1321 provided in the housing 1320 on the basis of a boundary between the pilot valve 1330 and the inlet disc 1360.

In this case, the amount of the working fluid flowing into the first pilot chamber 1321 through the inlet disc 1360 in the high-frequency region is not sufficient to smoothly form a pressure of the first pilot chamber 1321. Thus, the pressure of the main chamber 1311 is greater than the pressure of the second pilot chamber 1322 with respect to the pilot valve 1330, and then the pilot valve 1330 is elastically deformed upward. In other words, the pilot valve 1330 is spaced apart from the upper portion of the main retainer 1310.

As a result, during the high-frequency tension stroke, the working fluid flowing into the main chamber 1311 flows to the compression chamber 1230 as the pilot valve 1330 is open toward the first pilot chamber 1321, and during the high-frequency tension stroke, a damping force of the shock absorber is lowered as compared to the low-frequency tension stroke.

Figure 5:
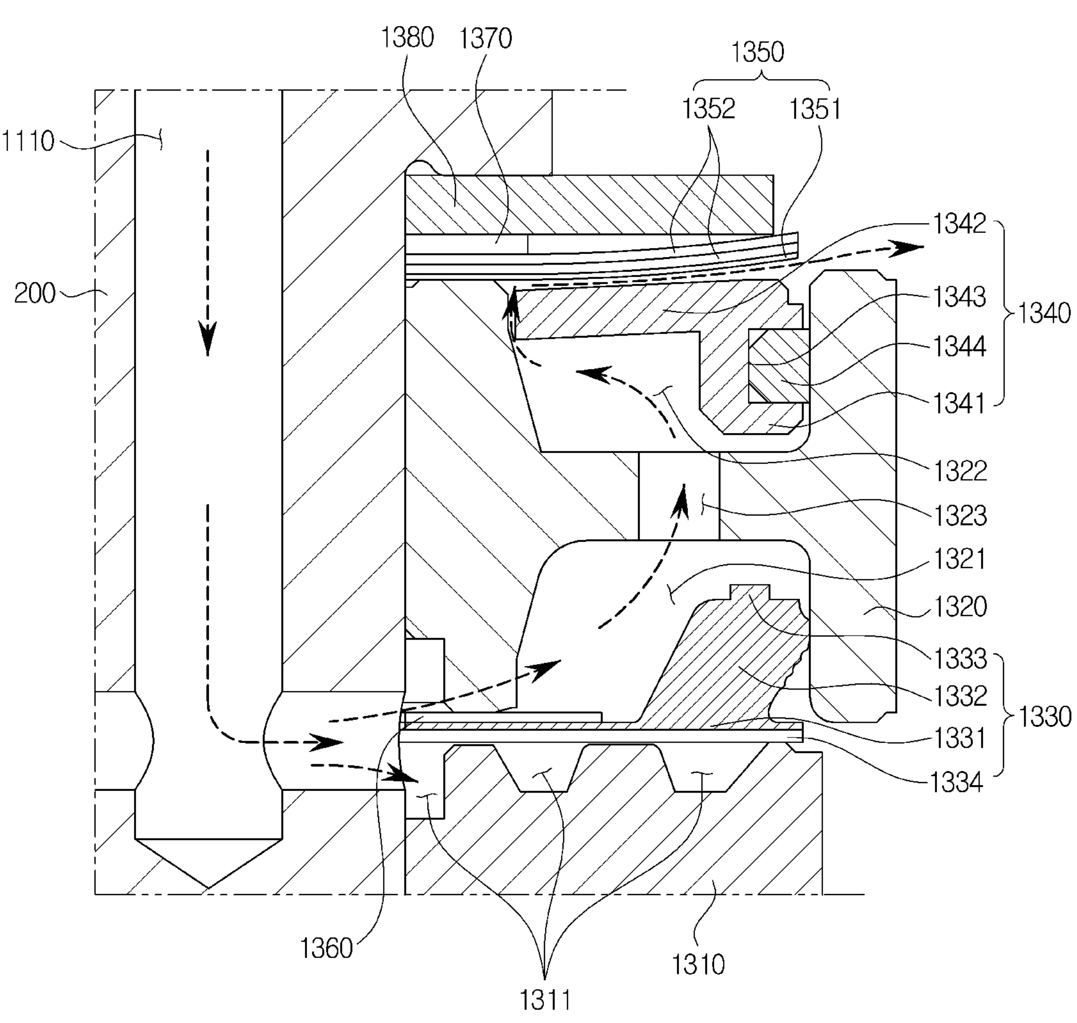
FIG. 5 is an enlarged view illustrating an operation in which a working fluid flowing into a connection flow path flows out through a pilot valve in the operation of the valve assembly during the low-frequency tension stroke of the frequency-sensitive shock absorber according to the first embodiment of the present disclosure.

FIG. 5 is an enlarged view illustrating an operation in which a working fluid flowing into the connection flow path 1110 flows out through the pilot valve 1330 in the operation of the valve assembly 1300 during the low-frequency tension stroke of the frequency-sensitive shock absorber according to the first embodiment of the present disclosure.

During the low-frequency tension stroke, an internal pressure of the second pilot chamber 1322 may be greater than a predetermined pressure due to the working fluid flowing into the second pilot chamber 1322. Referring to FIG. 5, first, the working fluid flowing into the first pilot chamber 1321 flows to the second pilot chamber 1322 through the intermediate flow path 1323.

Thereafter, the free piston 1340 provided inside the second pilot chamber 1322 is pushed upward, and the working fluid flowing into the second pilot chamber 1322 flows to a space provided between an upper portion of the free piston 1340 and the pilot disc 1350 through a space provided between the free piston 1340 and an inner wall of the housing 1320.

When the working fluid provided in the second pilot chamber 1322 and a space between the free piston 1340 and the pilot disc 1350 has a certain pressure or more, the pilot disc 1350 is elastically deformed upward. Thus, the working fluid flowing into the second pilot chamber 1322 flows out to the compression chamber 1230 to prevent the internal pressure of the second pilot chamber 1322 from being excessively increased. However, this may not be applied only to the tension stroke in the low-frequency region and may be also similarly applied to the tension stroke in the high-frequency region.

Hereinafter, a frequency-sensitive shock absorber according to a second embodiment of the present disclosure will be described.

The second embodiment of the present disclosure is different from the first embodiment of the present disclosure in terms of a detailed configuration of the valve assembly 1300. In detail, only one third pilot chamber 2321 obtained by merging the first pilot chamber 1321 and the second pilot chamber 1322 is provided inside a housing 2320, and a sealing sider 2330 is provided instead of the pilot valve 1330. Thus, as compared to the first embodiment of the present disclosure, in the second embodiment of the present disclosure, the shape of the complex housing 2320 is simplified, thereby reducing costs of materials and processes, and the pilot valve 1330 is replaced with the sealing sider 2330, thereby improving the durability.

Figure 6:
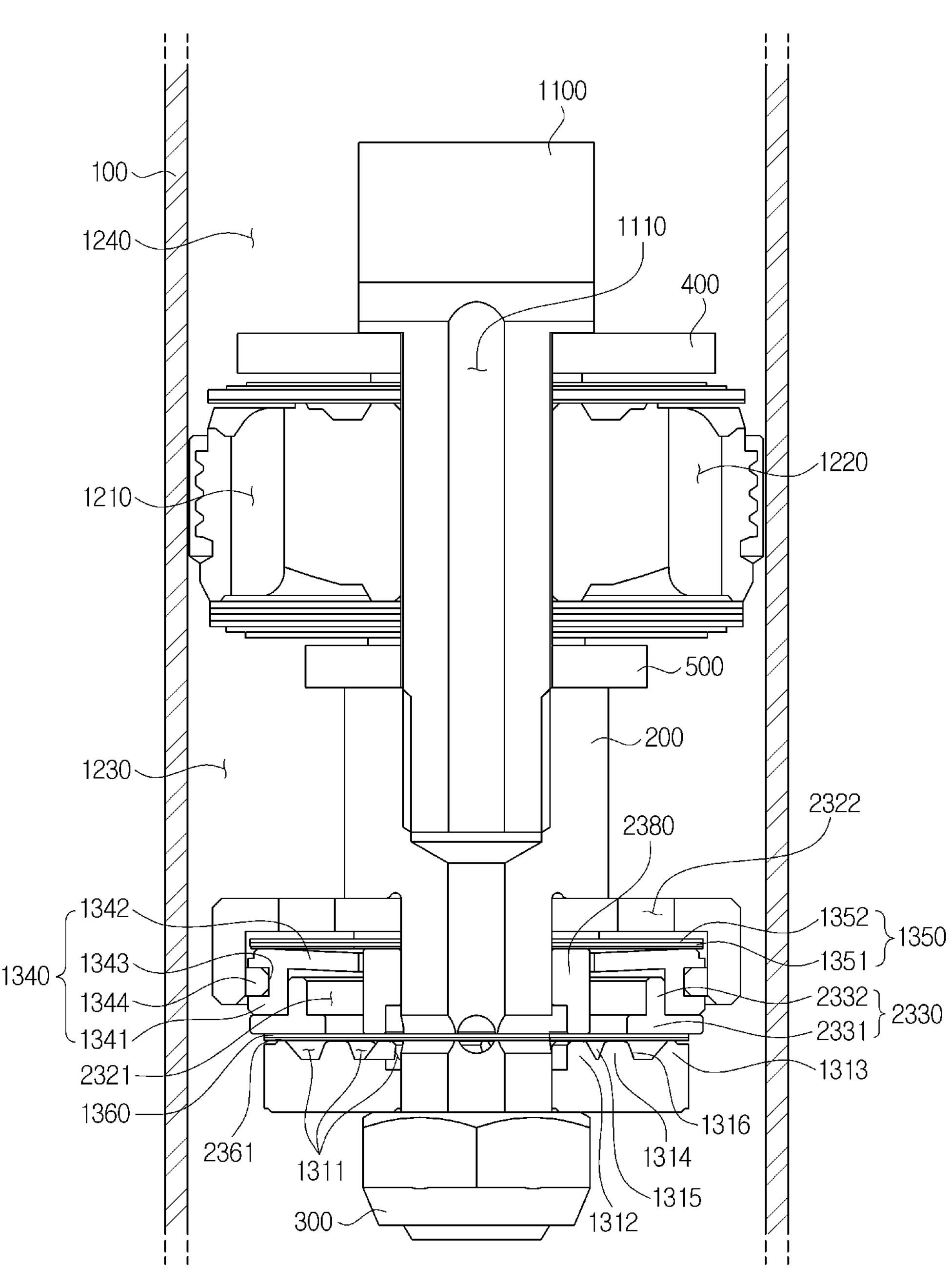
FIG. 6 is a cross-sectional view illustrating a frequency-sensitive shock absorber according to a second embodiment of the present disclosure.
Figure 7:
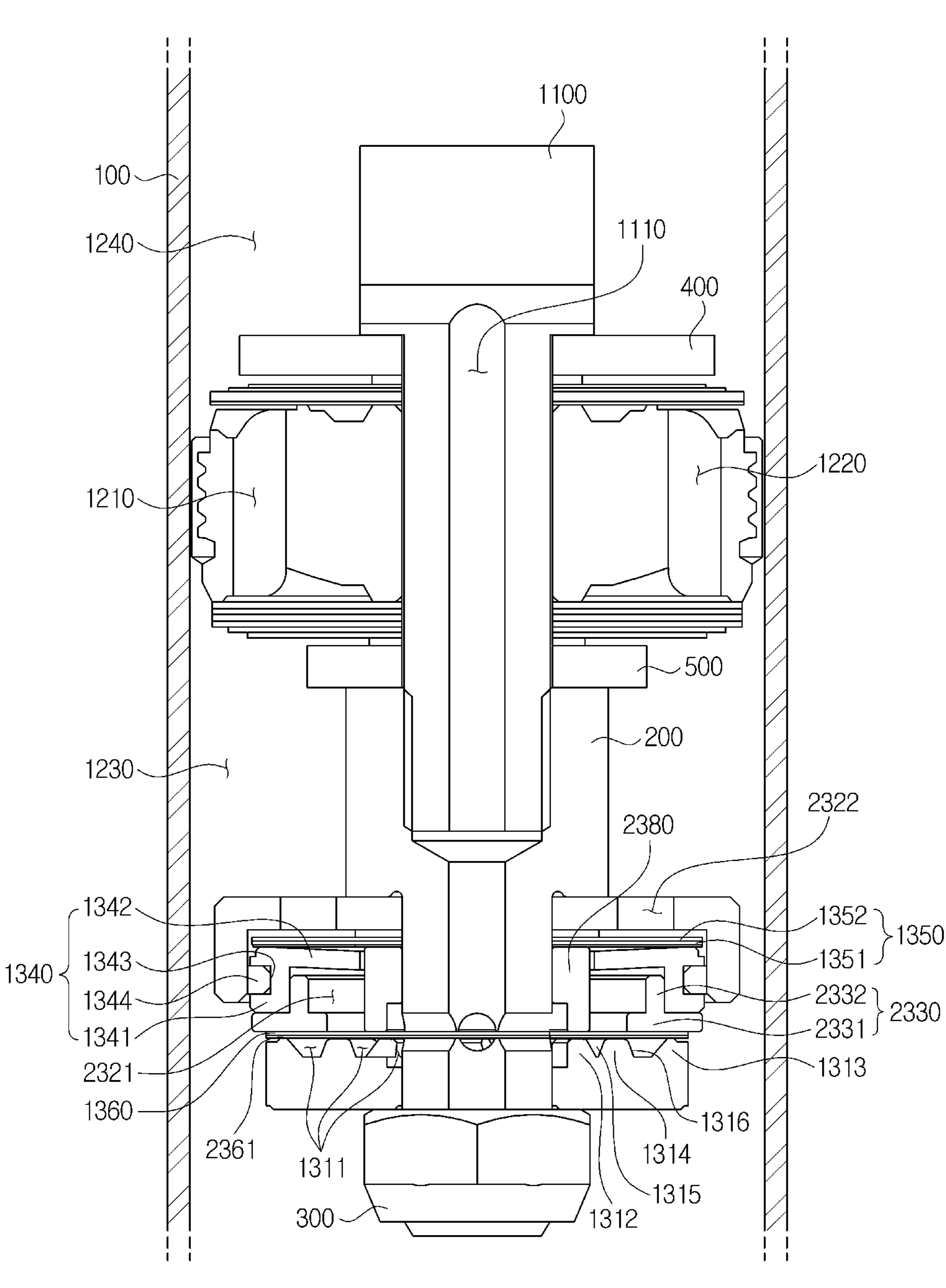
FIG. 7 is an exploded perspective view illustrating a valve assembly of the frequency-sensitive shock absorber according to the second embodiment of the present disclosure.

FIG. 6 is a cross-sectional view illustrating a frequency-sensitive shock absorber according to a second embodiment of the present disclosure, and FIG. 7 is an exploded perspective view illustrating a valve assembly 1300 of the frequency-sensitive shock absorber according to the second embodiment of the present disclosure.

Referring to FIGS. 6 and 7, the frequency-sensitive shock absorber according to the first embodiment of the present disclosure includes the piston rod 1100 that reciprocates inside the cylinder 100 and the piston valve 1200 and the valve assembly 1300 mounted on the piston rod 1100.

Hereinafter, the same above description of the frequency-sensitive shock absorber and the valve assembly 1300 of the shock absorber according to the first embodiment is applied to the description of the valve assembly 1300 according to the second embodiment of the present disclosure except for the case of additional description using separate reference numerals. Thus, the description will be omitted to prevent duplication of the contents.

The housing 2320 is coupled to the piston rod 1100 or the piston guide 200, the third pilot chamber 2321 is provided inside the housing 2320, and an upper portion of the housing 2320 except for a housing flow path 2322 formed to allow the third pilot chamber 2321 and the compression chamber 1230 to communicate with each other is formed to be closed.

Unlike the first embodiment in which the first pilot chamber 1321 and the second pilot chamber 1322 are provided, since the housing 2320 includes only the third pilot chamber 2321, a basic length of the component can be reduced, and a length of a damper stroke can be additionally secured as much as the reduced basic length of the component.

Unlike the first embodiment, the pilot disc 1350 and a spacer 2370 are provided inside the housing 2320. Thus, the role of the valve washer 1380 existing in the first embodiment may be replaced by the housing 2320, the valve washer 1380 may be omitted, and thus material costs are reduced.

A supporter 2380 is coupled to the piston rod 1100 or the piston guide 200. An upper end of the supporter 2380 is in contact with a lower end of the pilot disc 1350, and a lower end of the supporter 2380 is in contact with an upper end of the inlet disc 1360. Thus, the positions between the discs may be fixed, and a fastening force may be easily transmitted.

The inner end of the free piston ceiling portion 1342 is formed to be spaced apart from the supporter 2380 so that the working fluid filling the third pilot chamber 2321 may flow between the free piston 1340 and the supporter 2380.

The sealing sider 2330 is interposed between the free piston 1340 and the inlet disc 1360. In detail, the sealing sider 2330 includes a sealing body 2331 in close contact with an upper portion of the inlet disc 1360 and a sealing valve 2332 protruding along a center of the sealing body 2331 and of which an outer circumferential surface is in close contact with an inner circumferential surface of the free piston 1340. Thus, the sealing sider 2330 may seal the third pilot chamber 2321 to maintain the internal pressure.

An auxiliary inlet disc 2361 may be provided below the inlet disc 1360. The auxiliary inlet disc 2361 may be provided as a plurality of auxiliary inlet discs 2361 and may elastically support the inlet disc 1360 instead of not using the pilot valve 1330 provided in the first embodiment of the present disclosure.

Hereinafter, a method of operating the frequency-sensitive shock absorber according to the second embodiment of the present disclosure according to different frequencies will be described.

Figure 8:
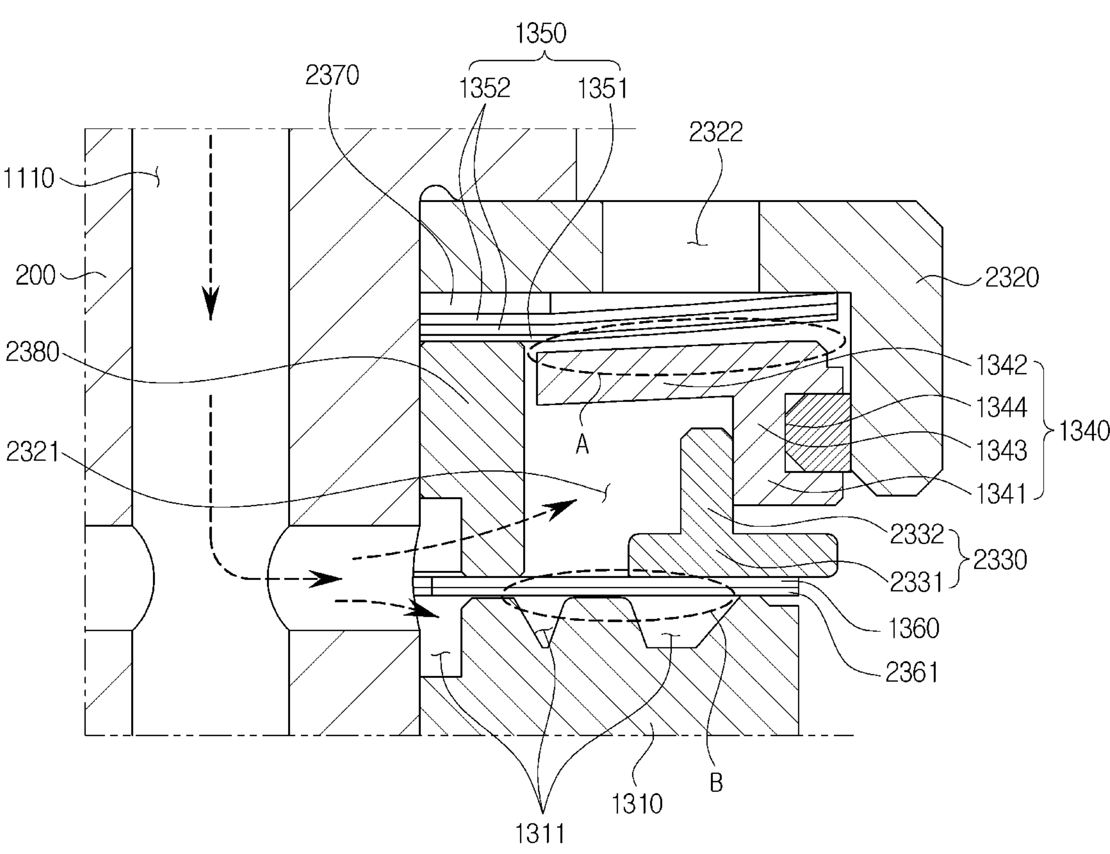
FIG. 8 is an enlarged view illustrating the operation of the valve assembly during a low-frequency tension stroke of the frequency-sensitive shock absorber according to the second embodiment of the present disclosure.

FIG. 8 is an enlarged view illustrating the operation of the valve assembly 1300 during a low-frequency tension stroke of the frequency-sensitive shock absorber according to the second embodiment of the present disclosure.

Referring to FIG. 8, when the frequency-sensitive shock absorber according to the second embodiment of the present disclosure performs the tension stroke in a low-frequency region, first, the working fluid flows into the valve assembly 1300 along the connection flow path 1110 provided inside the piston rod 1100.

In this way, the working fluid flowing into the valve assembly 1300 flows to the main chamber 1311 provided in the main retainer 1310 and the third pilot chamber 2321 provided in the housing 2320 on the basis of a boundary between the inlet disc 1360 and the auxiliary inlet disc 2361.

In this case, the amount of the working fluid flowing into the third pilot chamber 1321 through the inlet disc 1360 in the low-frequency region is sufficient to smoothly form a pressure of the first pilot chamber 1321.

When the pressure of the third pilot chamber 2321 increases a certain level or higher, the free piston 1340 slidably moves upward between the sealing sider 2330 and the housing 2320. Accordingly, an internal space of the third pilot chamber 2321 increases, and the amount of the working fluid accommodated in the third pilot chamber 2321 increases. That is, the third pilot chamber 2321 also serves as an accumulator through the upward movement of the free piston 1340.

The third pilot chamber 2321 and the main chamber 1311 are in pressure equilibrium with respect to the inlet disc 1360 and the auxiliary inlet disc 2361 so that the pilot valve 1330 is not elastically deformed. In other words, the inlet disc 1360 and the auxiliary inlet disc 2361 are maintained in contact with the upper portion of the main retainer 1310. That is, the working fluid flowing into the valve assembly 1300 flows to only the third pilot chamber 2321 after the main chamber 1311 is filled with the working fluid.

Area A illustrated in FIG. 8 is an area of the free piston ceiling portion 1342, and area B is an area to which the main chamber 1311 disposed to be opposite to the third pilot chamber 2321 applies a pressure in an upward direction. In this case, area A has a greater area than area B. When the internal pressures of the third pilot chamber 2321 and the main chamber 1311 are the same in the low-frequency region, and when area A has a greater area than area B, a downward pressing force is greater than an upward lifting force with respect to the inlet disc 1360 and the auxiliary inlet disc 2361. That is, the inlet disc 1360 and the auxiliary inlet disc 2361 are not elastically deformed.

Figure 9:
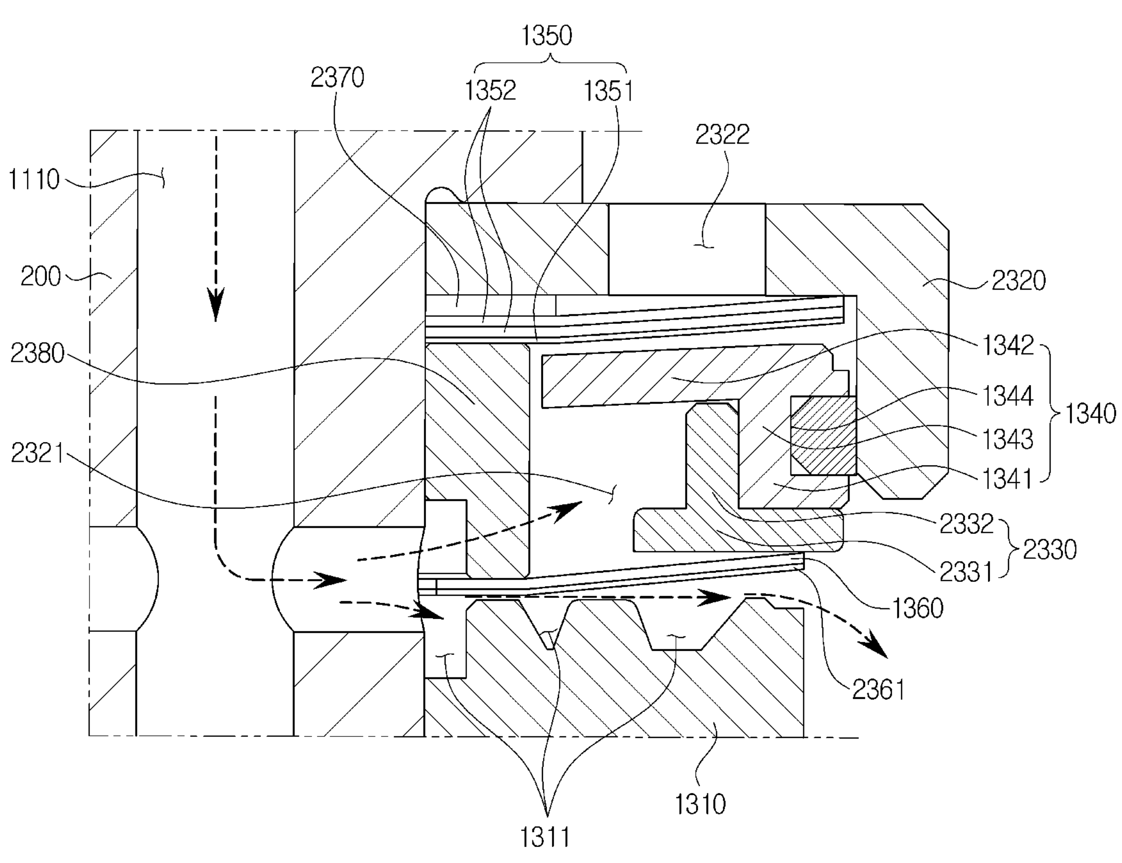
FIG. 9 is an enlarged view illustrating the operation of the valve assembly during a high-frequency tension stroke of the frequency-sensitive shock absorber according to the second embodiment of the present disclosure.

FIG. 9 is an enlarged view illustrating the operation of the valve assembly 1300 during a high-frequency tension stroke of the frequency-sensitive shock absorber according to the second embodiment of the present disclosure.

Referring to FIG. 9, when the frequency-sensitive shock absorber according to the second embodiment of the present disclosure performs the tension stroke in a high-frequency region, first, the working fluid flows into the valve assembly 1300 along the connection flow path 1110 provided inside the piston rod 1100.

In this way, the working fluid flowing into the valve assembly 1300 flows to the main chamber 1311 provided in the main retainer 1310 and the third pilot chamber 2321 provided in the housing 2320 on the basis of a boundary between the inlet disc 1360 and the auxiliary inlet disc 2361.

In this case, the amount of the working fluid flowing into the first pilot chamber 1321 through the inlet disc 1360 in the low-frequency region is not sufficient to smoothly form a pressure of the third pilot chamber 2321. Thus, the pressure of the main chamber 1311 is greater than the pressure of the third pilot chamber 2321 with respect to the inlet disc 1360 and the auxiliary inlet disc 2361, and thereafter the inlet disc 1360 and the auxiliary inlet disc 2361 are elastically deformed upward. In other words, the inlet disc 1360 and the auxiliary inlet disc 2361 are spaced apart from the upper portion of the main retainer 1310.

As a result, during the high-frequency tension stroke, the working fluid flowing into the main chamber 1311 flows to the compression chamber 1230 as the inlet disc 1360 and the auxiliary inlet disc 2361 are open toward the third pilot chamber 2321, and during the high-frequency tension stroke, the damping force of the shock absorber is lowered as compared to the low-frequency tension stroke.

Figure 10:
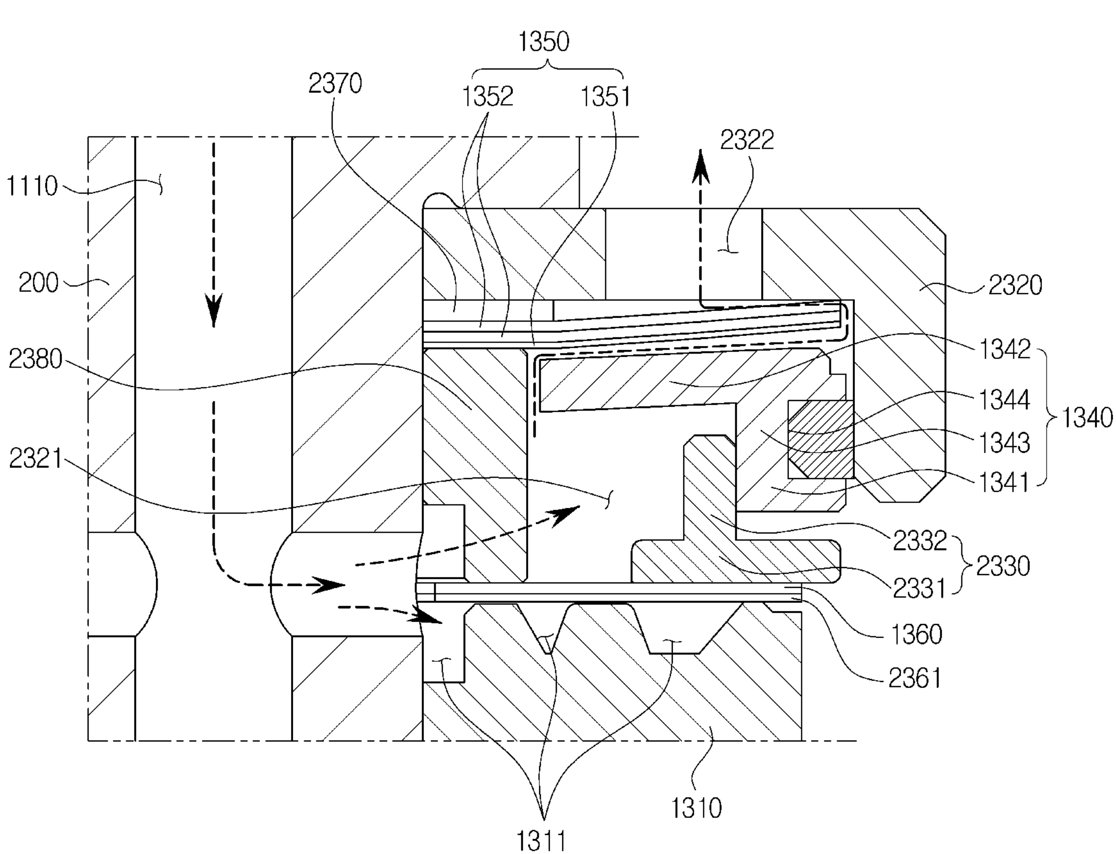
FIG. 10 is an enlarged view illustrating an operation in which a working fluid flowing into a connection flow path flows out through a pilot valve in the operation of the valve assembly during the low-frequency tension stroke of the frequency-sensitive shock absorber according to the second embodiment of the present disclosure.

FIG. 10 is an enlarged view illustrating an operation in which a working fluid flowing into the connection flow path 1110 flows out through the pilot valve 1330 in the operation of the valve assembly 1300 during the low-frequency tension stroke of the frequency-sensitive shock absorber according to the second embodiment of the present disclosure.

Referring to FIGS. 8 and 10, during the low-frequency tension stroke, when the internal pressure of the third pilot chamber 2321 is greater than a predetermined pressure due to the working fluid flowing into the third pilot chamber 2321, the free piston 1340 is pushed upward, and the working fluid flowing into the third pilot chamber 2321 flows to a space provided between the upper portion of the free piston 1340 and the pilot disc 1350 through a space provided between the free piston 1340 and the supporter 2380.

When the working fluid provided in a space between the free piston 1340 and the pilot disc 1350 inside the third pilot chamber 2321 has a certain pressure or higher, the pilot disc 1350 is elastically deformed upward. Thus, the working fluid flowing into the third pilot chamber 2321 flows out to the compression chamber 1230 through the housing flow path 2322 provided in the housing 2320 to prevent the internal pressure of the third pilot chamber 2321 from being excessively increased. However, this may not be applied only to the tension stroke in the low-frequency region and may be also similarly applied to the tension stroke in the high-frequency region as illustrated in FIG. 9.

Figure 11:
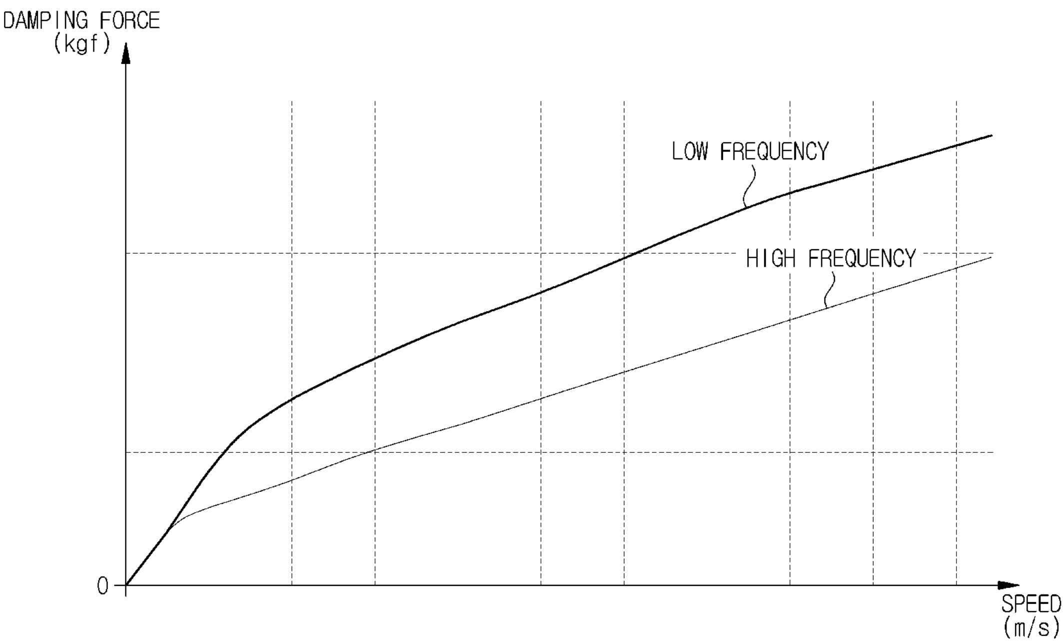
FIG. 11 is a graph for describing a change in damping force according to a speed of a frequency-sensitive shock absorber according to an embodiment of the present disclosure.

FIG. 11 is a graph for describing a change in damping force according to a speed of a frequency-sensitive shock absorber according to an embodiment of the present disclosure.

Referring to FIG. 11, in the frequency-sensitive shock absorber according to the embodiment of the present disclosure, the amount of the working fluid passing through the connection flow path 1110 and flowing into the pilot chamber and the main chamber 1311 changes according to the frequency during the tension stroke. Therefore, in a low speed section, a similar damping force is implemented at a low frequency and a high frequency, and in a middle and high speed section, a damping force is reduced at the high frequency, so that the ride comfort and stability of the vehicle may be satisfied at the same time.

In detail, in the low speed section, the damping force is prevented from being reduced regardless of the frequency, and thus the steering stability of the vehicle is prevented from being degraded. In the middle and high speed section, the damping force is reduced only for high-frequency vibrations generated by foreign substances on a road surface. Therefore, the ride comfort of the vehicle may be improved.

As is apparent from the above description, according to the spirit of the present disclosure, there are provided a frequency-sensitive shock absorber that can satisfy ride comfort and steering stability of a vehicle by generating a damping force that changes according to a frequency and a speed change by installing a valve assembly together with a piston valve, and a method of operating the same.

According to the spirit of the present disclosure, there are provided a frequency-sensitive shock absorber that can prevent performance of the steering stability from being degraded by preventing a damping force from being degraded in a low speed section during a tension stroke at a high frequency region, and a method of operating the same.

According to the spirit of the present disclosure, there are provided a frequency-sensitive shock absorber that can prevent performance of the ride comfort from being degraded due to a decrease in performance of the damping force in a middle and high speed section during the tension stroke at the high frequency region, and a method of operating the same.

According to the spirit of the present disclosure, there are provided a frequency-sensitive shock absorber that can improve space utilization by reducing a basic length of a product and increase and secure a damper stroke, and a method of operating the same.

According to the spirit of the present disclosure, there are provided a frequency-sensitive shock absorber having improved performance of the damping force using a free piston having a long vertical sliding length in the valve assembly, and a method of operating the same.

According to the spirit of the present disclosure, there are provided a frequency-sensitive shock absorber having increased durability by improving durability of the valve assembly, and a method of operating the same.

According to the spirit of the present disclosure, there are provided a frequency-sensitive shock absorber that reduces costs and improves mass productivity by reducing the number of components and simplifying the components, and a method of operating the same.

What is claimed is:

1. A frequency-sensitive shock absorber comprising:

a piston rod which reciprocates inside a cylinder and in which a connection flow path is formed in a lengthwise direction;

a piston valve which is mounted on the piston rod, through which a plurality of compression flow paths and a plurality of tension flow paths vertically pass, and which divides the cylinder into a compression chamber and a tension chamber; and a valve assembly mounted on the piston rod and configured to generate a damping force that changes according to a frequency during a tension stroke, wherein the valve assembly includes:

a main retainer in which a main chamber communicating with the connection flow path is formed;

a housing including a first pilot chamber formed at a lower portion thereof and configured to communicate with the connection flow path, a second pilot chamber formed at an upper portion thereof and configured to communicate with the first pilot chamber, and an intermediate flow path connecting the first pilot chamber and the second pilot chamber;

a pilot valve disposed between the housing and the main retainer, configured to divide the first pilot chamber from the main chamber, and elastically deformed due to a pressure difference between the main chamber and the pilot chamber; and a free piston provided inside the second pilot chamber and configured to vertically move according to a change in pressure of the second pilot chamber.

2. The frequency-sensitive shock absorber of claim 1, wherein the valve assembly further includes a pilot disc disposed on the second pilot chamber and elastically deformed according to the change in the pressure of the second pilot chamber.

3. The frequency-sensitive shock absorber of claim 2, wherein the free piston includes:

a free piston side wall portion of which an outer circumferential surface is provided adjacent to an inner circumferential surface of the second pilot chamber; and a free piston ceiling portion of which an upper surface is provided adjacent to a lower surface of the pilot disc.

4. The frequency-sensitive shock absorber of claim 3, wherein the free piston includes:

a seal accommodation port recessed inward from the free piston side wall portion along a side surface thereof; and a piston seal accommodated in the seal accommodation port and of which one side is in close contact with the housing.

5. The frequency-sensitive shock absorber of claim 3, wherein the free piston ceiling portion has an inner end spaced apart from the housing.

6. The frequency-sensitive shock absorber of claim 3, wherein the free piston ceiling portion has an upper surface of an outer end in contact with the lower surface of the pilot disc and is inclined downward toward an inner end thereof.

7. The frequency-sensitive shock absorber of claim 2, wherein the pilot disc includes a pilot adjustment disc configured to adjust a flow rate of a working fluid flowing out from the second pilot chamber.

8. The frequency-sensitive shock absorber of claim 7, wherein the pilot disc includes an auxiliary pilot disc configured to elastically support the pilot adjustment disc.

9. The frequency-sensitive shock absorber of claim 2, wherein the valve assembly includes a spacer coupled to the piston rod and provided at an upper end of the pilot disc.

10. The frequency-sensitive shock absorber of claim 9, wherein the valve assembly includes a valve washer coupled to the piston rod, provided at an upper end of the spacer, and extending outward to support the elastically deformed pilot disc from above.

11. The frequency-sensitive shock absorber of claim 1, wherein the pilot valve includes a pilot body portion of which a lower surface is in close contact with an upper portion of the main retainer and a pilot valve portion protruding along an outer edge of the pilot body portion to be in close contact with an inner circumferential surface of the housing.

12. The frequency-sensitive shock absorber of claim 11, wherein the pilot valve portion includes a valve protrusion protruding upward from an upper surface thereof.

13. The frequency-sensitive shock absorber of claim 1, wherein the main retainer includes:

first seat portions protruding at predetermined intervals along an inner edge thereof;

second seat portions protruding along an outer edge thereof; and a first main flow path formed between the first seat portions to communicate with the connection flow path.

14. The frequency-sensitive shock absorber of claim 13, wherein the main retainer includes:

third seat portions protruding at predetermined intervals between the first seat portions and the second seat portions; and a second main flow path formed between the third seat portions to communicate with the first main flow path.

15. The frequency-sensitive shock absorber of claim 1, wherein the valve assembly further includes an inlet disc interposed between the pilot valve and the housing and having at least one slit configured to allow the connection flow path and the first pilot chamber to communicate with each other.

16. The frequency-sensitive shock absorber of claim 1, wherein the pilot valve further includes at least one auxiliary pilot valve disc interposed between the pilot valve and the main retainer.

17. A method of operating a frequency-sensitive shock absorber including a piston rod that reciprocates inside a cylinder, a piston valve mounted on the piston rod and configured to divide the cylinder into a compression chamber and a tension chamber, and a valve assembly mounted on the piston rod and configured to generate a damping force that changes according to a frequency during a tension stroke, wherein, in the case of a tension stroke at a low frequency region, a working fluid flows into the valve assembly along a connection flow path provided inside the piston rod, the working fluid flowing into the valve assembly flows to a main chamber provided in a main retainer and a first pilot chamber provided in a housing, and a pilot valve disposed between the housing and the main retainer achieves pressure equilibrium so that the working fluid flowing into the valve assembly flows to with only the first pilot chamber.

18. The method of claim 17, wherein the working fluid flowing into the first pilot chamber flows to a second pilot chamber through an intermediate flow path, a free piston provided inside the second pilot chamber is pushed upward, the working fluid flowing into the second pilot chamber flows to a space between the free piston and a pilot disc provided on the free piston through a space provided between the free piston and an inner wall of the housing, and the pilot disc is elastically deformed upward so that the working fluid flowing into the second pilot chamber flows out to the compression chamber.

19. A method of operating a frequency-sensitive shock absorber including a piston rod that reciprocates inside a cylinder, a piston valve mounted on the piston rod and configured to divide the cylinder into a compression chamber and a tension chamber, and a valve assembly mounted on the piston rod and configured to generate a damping force that changes according to a frequency during a tension stroke, wherein, in the case of a tension stroke at a high frequency region, a working fluid flows into the valve assembly along a connection flow path provided inside the piston rod, the working fluid flowing into the valve assembly flows to a main chamber provided in a main retainer and a first pilot chamber provided in a housing, and a pilot valve disposed between the housing and the main retainer is elastically deformed upward so that the working fluid flowing into the main chamber flows out to the compression chamber.

20. The method of claim 19, wherein the working fluid flowing into the first pilot chamber flows to a second pilot chamber through an intermediate flow path, a free piston provided inside the second pilot chamber is pushed upward, the working fluid flowing into the second pilot chamber flows to a space between the free piston and a pilot disc provided on the free piston through a space provided between the free piston and an inner wall of the housing, and the pilot disc is elastically deformed upward so that the working fluid flowing into the second pilot chamber flows out to the compression chamber.

* * * * *